United States Patent
Vidal (10) Patent No.: US 10,129,053 B2
(45) Date of Patent: Nov. 13, 2018

(54) STEEPEST DESCENT FFE COMPUTATION AND TRACKING

(71) Applicant: MULTIPHY LTD., Ness-Ziona (IL)

(72) Inventor: Or Vidal, Kfar Yona (IL)

(73) Assignee: MULTIPHY LTD., Ness-Ziona (IL)

( * ) Notice: Subject to any disclaimer, the term of this patent is extended or adjusted under 35 U.S.C. 154(b) by 0 days.

(21) Appl. No.: 15/166,654

(22) Filed: May 27, 2016

(65) Prior Publication Data

US 2016/0352540 A1 Dec. 1, 2016

Related U.S. Application Data (60) Provisional application No. 62/167,365, filed on May 28, 2015.

(51) Int. Cl.
    *H04L 27/18* (2006.01)
    *H04L 25/03* (2006.01)

(52) U.S. Cl.
    CPC .......... *H04L 25/03133* (2013.01); *H04L 2025/03611* (2013.01)

(58) Field of Classification Search
    CPC .......... H04L 25/03133; H04L 2025/03611
    USPC .................... 375/233, 232, 147, 326, 346
    See application file for complete search history.

(56) References Cited

U.S. PATENT DOCUMENTS

| | | | | |
|---|---|---|---|---|
| 6,570,918 B1 * | 5/2003 | Rademacher | ........ | H04B 1/7115 375/147 |
| 2002/0054634 A1 * | 5/2002 | Martin | ............ | H04L 25/03057 375/232 |
| 2004/0190649 A1 * | 9/2004 | Endres | ................. | H04L 7/0278 375/326 |
| 2004/0208266 A1 * | 10/2004 | Lenosky | ............ | H04B 10/2543 375/346 |

* cited by examiner

*Primary Examiner* — Chieh M Fan
*Assistant Examiner* — Fitwi Hailegiorgis
(74) *Attorney, Agent, or Firm* — Fisherbroyles, LLP; Robert Kinberg (57) ABSTRACT

A nonlinear equalizer for iteratively equalizing a data communication channel, which comprises a transmitter at the input of the channel, for transmitting data and one or more training sequences over the channel; a receiver at the output of the channel, for receiving the data and the one or more training sequences; a sampling circuit for sampling received data; a processor, for processing the samples. The processor is adapted to calculate the derivative of the MSE for each of the FFE taps; calculate the derivative of the variance of the enhanced noise with the FFE taps; iteratively update the FFE coefficients, while during each update, injecting samples of a known training sequence into the channel. During each update, the processor computes the derivative of the output noise variance, by applying convolution between the noise correlation and the current FFE taps; computes the effective channel and the modified effective channel; computes the derivative of the residual ISI, by applying correlation between the original channel h and the modified effective channel; and updates the FFE coefficients, with a step proportional to the opposite of the gradient.

9 Claims, 6 Drawing Sheets

STEEPEST DESCENT FFE COMPUTATION AND TRACKING

CROSS-REFERENCE TO RELATED APPLICATION

This application claims the benefit of U.S. Provisional Application No. 62/167,365, filed May 28, 2015, the disclosure of which is incorporated herein by reference in its entirety.

FIELD OF THE INVENTION

The present invention relates to the field of high-speed communication systems. More particularly, the invention relates to an iterative method and system for calculating Feed Forward Equalization (FFE) coefficients, based on the steepest descent method.

BACKGROUND OF THE INVENTION

Optical and other high-speed communication channels suffer from dispersion which changes the shape of pulses which encode symbols being transmitted. Dispersion and pulse shape changes arise from the fact that different frequency components propagate at different velocities. This phenomenon causes Inter-Symbol Interference (ISI) between neighboring pulses, and ISI limits the number of discrete amplitude levels for symbol pulses which can be successfully detected. Equalization is a way of eliminating or reducing ISI.

If the exact characteristics of the channel are known, ISI can be eliminated or reduced substantially by using a pair of filters, one at the transmitter which does pre-channel equalization, and one at the receiver does post-channel equalization, so as to control the pulse shape distortion. If the filter characteristics of these filters are set correctly, the transmit filter pre-distorts the pulse shapes so that the distortions in the channel do not cause ISI at the sample instants and the receive filter takes care of any remaining ISI noise before each received symbol is fed to the slicer for decision.

However, the characteristics of the channel are rarely known in advance, and are time-varying. In addition, there is always imprecision that arises in implementation of the filters. Therefore, there is always some distortion such that ISI will limit the data rate of the system. To compensate for this residual distortion, equalization is performed, using an equalizer (a type of filter).

In general, equalization at the receiver side is much more popular than pre-equalization at the transmitter side, because it saves the need to inform the transmitter of the exact channel conditions.

Equalizers are adaptive usually to adjust to time varying conditions for ISI reduction. Adaptive Finite Impulse Response (FIR) equalizers are digital tapped delay line filters with impulse responses defined by the tap weights, called the filter coefficients.

The adaptive equalization process involves setting tap weights, decoding data symbols and/or receiving training data and processing it to determine whether slicer errors are occurring or will occur in reception of the data, then altering the tap weights and, sometimes, processing the training data again to determine if the number of errors was reduced. The process of adapting the tap weights to change the filter characteristics continues, until the number of errors at the receiver side is minimized (a convergence state). Typically, adaptation is achieved by observing the error between the desired pulse shape and the actual pulse shape at the output of the equalizer filter, measured at the sampling instants, and then using this error to determine the direction in which the tap weights should be altered to approach an optimum set of values.

Equalizer Initialization

There are two main methods for initializing and updating Feed Forward Equalization (FFE) coefficients. The first method is to use an adaptive filter algorithm. This algorithm changes the equalizer weights directly to move towards a minimum point of error criteria, without estimating the channel coefficients. However, adaptive filter algorithms require a large amount of continues samples to converge and they are not suitable to work with training symbols which are available only in short bursts. They suffer from tracking noise and they are very sensitive to step size selection. They are usually easy to implement in hardware. Since these algorithms work in a close loop, the coefficients may diverge under some conditions.

The second method uses analytic computation, based on channel estimation. This method requires solving the equations that lead to the FFE coefficients and is preferred mainly because it provides better performance and its effect on system performance are easier to determine. However, analytic computation requires complicated software and hardware and is problematic regarding the update or tracking speed, since the data rate in an optical communication channel is very high.

In addition, the CPU estimated update time is about 1 mSec, during which the FFE coefficients remain fixed and therefore, do not compensate any changes in the channel which take place during this time period. This slow update time and further latency effects raise the need to provide a hardware-based algorithm that replaces software computation, while separating the parameter estimation task from the FFE coefficients computation task. Therefore, the task of solving the equations and obtaining the FFE coefficients is more suitable for software implementation.

The Concept of a Feed Forward Equalizer

The FFE main purpose is to reshape or shorten the channel so that it will be most suitable for processing by the MLSE at the receiver side. It does that by minimizing the power of all the noise sources (at FFE output) which are not covered directly by the MLSE, such as Residual ISI and enhanced noise (i.e., the variance of the noise at the FFE output).

It is assumed that the model of a typical channel includes a fading channel (a channel with deviation of the attenuation) with an impulse response h taken from the channel estimation mechanism, and additive noise W, with a correlation function given by:

$$R_{ww}[l] = E(W[n]W[n-l]), l=-cl:cl, \qquad [\text{Eq. 1}]$$

where cl is the assumed noise correlation length

After applying the FFE to the channel h, a new effective channel g[n] is obtained, and can be described by:

$$g[n] = \Sigma_{k=0}^{L-1} h[l] f[n-l] \qquad [\text{Eq. 2}]$$

where L—is the assumed length of the channel impulse response and f[ ] are the coefficients of the FFE.

A cursor position and a window of Nisi taps are defined. Where Nisi is the number of post cursor taps allowed after the FFE operation.

The window and cursor taps are left for the MLSE processing. The cursor tap (the tap that multiplies the data symbols that are to be decoded. The other taps multiply symbols regarded as ISO is expected to be ~1.

All the taps outside the window and cursor taps which are difference from 1 are considered to be residual ISI, which is given by:

$$ResISI = \sum_{l=1}^{Cursor-1} |g[l]|^2 \sum_{l=Cursor+Nisi}^{L+F-1} |g[l]|^2 + |g[cursor]-1|^2 \quad [Eq.\ 3]$$

The following channel is defined:

$$g_{Win} = g \quad [Eq.\ 4]$$

$$g_{Win}[cursor] = g[cursor] - 1 \quad [Eq.\ 5]$$

$$g_{Win}[cursor+1: cursor+Nisi] = 0 \quad [Eq.\ 6]$$

The expression for the residual ISI may be expressed by:

$$ResISI = \sum_{l=1}^{L+F-1} g_{Win}[l]|^2 \quad [Eq.\ 7]$$

where F is the number of FFE coefficients.

Enhanced noise is the variance of the noise at the FFE output and is given by:

$$n_{out} = \sum_{k=1}^{F-1} f[k] W[n-k] \quad [Eq.\ 8]$$

$$E(|n_{out}|^2) = E(\sum_{k=1}^{F-1} \sum_{l=1}^{F-1} f[l]f[k] W[n-k] W[n-l])$$
$$= \sum_{k=1}^{F-1} \sum_{l=1}^{F-1} f[l]f[k] R_{ww}[k-l] = \sum_{M=0}^{cl} R_{ww}[M]$$
$$\sum_{k=1}^{F-1} f[k] f[k-M] \quad [Eq.\ 9]$$

where $E(|n_{out}|^2)]$—is the target function (the total power of the noise at the FFE output).

The Mean Square Error (MSE) at the FFE output is defined as the sum of the residual ISI and the variance of the enhanced noise, and is given by:

$$MSE = ResISI + E(|n_{out}|^2) \quad [Eq.\ 10]$$

The optimal FFE coefficients in the Minimum Mean Square Error (MSE—an estimation method which minimizes the MSE) Decision Feedback Equalizer (DFE—an adaptive equalizer in which once the value of the current transmitted symbol is determined it is possible to exactly remove the ISI contribution of that symbol to future received symbols). Once the current symbol has been decided, the filter structure can calculate the ISI effect it would tend to have on subsequent received symbols and compensate the input to the decision device for the next samples. This postcursor ISI removal is accomplished by the use of a feedback filter structure) criteria, minimize the MSE.

It is an object of the present invention to provide a system and method for calculating Feed Forward Equalization (FFE) coefficients, using an iterative process.

It is another object of the present invention to provide a system and method for calculating Feed Forward Equalization (FFE) coefficients, which does not require a large number of samples and rapidly converges.

Other objects and advantages of the invention will become apparent as the description proceeds.

SUMMARY OF THE INVENTION

The present invention is directed to a nonlinear equalizer for iteratively equalizing a data communication channel, which comprises a transmitter at the input of the channel, for transmitting data and one or more training sequences over the channel; a receiver at the output of the channel, for receiving the data and the one or more training sequences; a sampling circuit for sampling received data; a processor, for processing the samples. The processor is adapted to calculate the derivative of the MSE for each of the FFE taps; calculate the derivative of the variance of the enhanced noise with the FFE taps; iteratively update the FFE coefficients, while during each update, injecting samples of a known training sequence into the channel. During each update, the processor computes the derivative of the output noise variance, by applying convolution between the noise correlation and the current FFE taps; computes the effective channel and the modified effective channel; computes the derivative of the residual ISI, by applying correlation between the original channel h and the modified effective channel; and updates the FFE coefficients, with a step proportional to the opposite of the gradient.

The present invention is also directed to a method of calculating the coefficient of FFE/DFE equalizer equalizing a data communication channel, according to which an analytical estimated channel model is generated and real time steepest descent iterative computation and tracking process are applied, based on the model, while performing real time hardware tracking by using new channel estimation inputs and previous FFE/DFE coefficients, for convergence to a new optimal solution. The method may be implemented to coherent systems.

In one aspect, a cost-function for optimization of FFE/DFE coefficients for reaching an optimal solution that corresponds to a minimal value of a defined cost-function is defined according to an implementation/application criterion, which may be MMSE;

Zero-Forcing (ZF); fixed target channel and MMSE—Unit Energy Constraint (MMSE-UEC: an energy boosting constraint that is applied to the problem of representing the maximum number of bits for symbol that can be transmitted over the channel with average cost per symbol that does not exceed a predetermined threshold).

The equalized data channel may be part of:
data center connectivity;
router connectivity;
data center interconnections;
optical networks;
a metro system;
a wireless back-haul (intermediate links between the core network, or backbone network and the small sub-networks at the "edge" of the entire hierarchical network);
communication links with slow varying channels.

The signals transmitted through the data communication channel may be modulated according to modulation format that is selected from the group of
Non-Return-To-Zero (NRZ);
On-Off Keying (OOK);
Optical Dual Binary (ODB);
Pulse-Amplitude Modulation (PAM);
Quadrature Amplitude Modulation (QAM);
Phase-Shift Keying (PSK);
Frequency-Shift Keying (FSK);
Minimum-Shift Keying (MSK).

The derivative of the variance of the enhanced noise with the taps of the FFE in one or more iterations may be a convolution between the input noise correlation and the current FFE coefficients. The training sequences may be replaced by decisions of a decision algorithm, for decoding the received data.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The present invention proposes a system and method for calculating Feed Forward Equalization (FFE) coefficients, using an iterative process, which on one hand, does not require a large number of samples and on the other hand, rapidly converges. The proposed system assumes that the changes in the communication channel are very slow. Therefore, the solution executes only a portion of the analytic computation and assures that after relatively few iterations, the solution (the computation of coefficients) will converge to the fully analytic solution.

The solution proposed by the present invention used the steepest descent (gradient descent) algorithm (an algorithm for finding the nearest local minimum of a function which presupposes that the gradient of the function can be computed), which is an iterative algorithm for finding a local minimum of a function by taking steps proportional to the gradient of the function.

A cost-function for optimization of FFE/DFE coefficients for reaching an optimal solution that corresponds to a minimal value of a defined cost-function is defined according to an implementation/application criterion, which may be MMSE. According to the present invention, the cost-function to be minimized is the MSE at the FFE output. Thus, the FFE coefficients update step is given by:

$$\underline{f}^{(i+1)} = \underline{f}^{(i)} - \alpha \cdot \frac{dMSE}{d\underline{f}^{(i)}} \qquad [\text{Eq. 11}]$$

Where α is a design parameter
$f^{(i)}$—the FFE coefficients of the current update
$f^{(i+1)}$—the FFE coefficients of the next update Zero-Forcing (ZF); fixed target channel and MMSE—Unit Energy Constraint (UEC).

The expression for MSE is given by [Eq. 10]. The derivative of the MSE for each of the FFE taps is given by:

$$\frac{dMSE}{d\underline{f}} = \frac{d(ResIsi)}{d\underline{f}} + \frac{d(E(|n_{out}|^2))}{d\underline{f}} \qquad [\text{Eq. 12}]$$

The two derivatives for a specific FFE tap are given by:

$$\frac{d(ResIsi)}{df[p]} = \frac{d\left\{\sum_{l=1}^{L+F-1}|g_{Win}[l]|^2\right\}}{df[p]} =$$

$$\sum_{l=1}^{L+F-1} 2 \cdot g_{Win}[l]\frac{dg_{Win}[l]}{df[p]} = \sum_{l=1}^{L+F-1} 2 \cdot g_{Win}[l]\frac{dg[l]}{df[p]} \qquad [\text{Eq. 13}]$$

The derivative of the effective channel with the FFE coefficient are given by:

$$\frac{dg[n]}{df[p]} = \frac{d\sum_{k=0}^{L-1} h[l]f[n-1]}{df[p]} = h[n-p] \qquad [\text{Eq. 14}]$$

where p is the FFE coefficient index to be updated.
Combining the two results yields:

$$\frac{d(ResIsi)}{df[p]} = \sum_{l=1}^{L+F-1} 2 \cdot g_{Win}[l]h[l-p] \qquad [\text{Eq. 15}]$$

It is seen that the derivatives of the residual ISI with the FFE coefficients is the correlation function between the modified effective channel $g_{Win}$ and the original channel h.

The derivative of the variance of the enhanced noise with the taps of the FFE is given by:

$$\frac{d(E(|n_{out}|^2))}{df[p]} =$$

$$\frac{d\left(\sum_{M=0}^{cl} R_{WW}[M]\sum_{k=1}^{F-1} f[k]f[k-M]\right)}{df[p]} = \sum_{M=0}^{cl} R_{WW}[M]f[p-M] \qquad [\text{Eq. 16}]$$

It can be seen that in this case, the derivative is a simple convolution between the input noise correlation and the current FFE coefficients. The steepest decent algorithm is used to calculate the derivative of the MSE (the "target function") as a function of the residual ISI and of the noise, in order to obtain the minimum.

The FFE coefficients are iteratively updated, while during each update, samples of a known training sequence are injected into the channel. FFE coefficients update may be done for example every several millions of symbols. Each training sequence is received at the receiver side and can be accurately identified (since it is known in advance) and is used to update the FFE coefficients. Alternatively, it is possible to use a decision algorithm to decode the received data (rather than using training sequences) and use it as it would have been a known sequence (provided that there were no decoding errors).

During each update, the performed operations are:
Computing the derivative of the output noise variance, by applying convolution between the noise correlation and the current FFE taps:

$$dN = R_{WW} * f^{(i-1)} \qquad [\text{Eq. 17}]$$

Computing the effective channel g and the modified effective channel $g_{Win}$:

$$g = h * f^{(i-1)} \qquad [\text{Eq. 18}]$$

$$g_{Win} = g \qquad [\text{Eq. 19}]$$

$$g_{Win}[\text{cursor}] = g[\text{cursor}] - 1 \qquad [\text{Eq. 20}]$$

$$g_{Win}[\text{cursor}+1: \text{cursor}+Nisi] = 0 \qquad [\text{Eq. 21}]$$

where, h—The channel impulse response taken from the channel estimation mechanism $R_{WW}$—The noise correlation vector for noise correlation estimator (software)

$f^{(i-1)}$—The FFE coefficients from last update

Computing the derivative of the residual ISI, by applying correlation between the original channel h and the modified effective channel $g_{Win}$:

$$dR = \bar{h} * g_{Win} \quad [\text{Eq. 22}]$$

where $\bar{h}$ is a flipped version of h.

Updating the FFE coefficients, with a step proportional to the opposite of the gradient:

$$f^{(i)} = f^{(i-1)} - \alpha \cdot (dN + dR) \quad [\text{Eq. 23}]$$

It can be seen that each update requires 3 vector convolution operations and a final vector subtract operation. The advantage of the proposed method is rapid convergence to the MMSE analytical (and optimal) solution using iterations (rather than a statistical algorithm).

FIGS. 1a-1f illustrate the convergence of the proposed algorithm for several randomly chosen channels, from a simple (trivial) initialization (impulse) with a small step size of 0.1. It can be seen that for the tested random channels, the algorithm rapidly converges to the MMSE analytical solution, as expected. The algorithm shows perfect stability and converges to the MMSE analytical solution.

FIGS. 2a-2d illustrate the performance of one iteration with a large step size of 0.5, after initializing the algorithm with the optimal FFE+some error vector, for different noise levels. It can be seen that the proposed algorithm gives an improvement of several dBs towards the target SNR, even after a single iteration, at "tracking" mode.

Another advantage is that in all the above examples, the proposed iterative algorithm always improves the equalization or remains as in the last iteration, but never deteriorate the last result (unlike using an adaptive algorithm that may deteriorate).

Figure 1A:
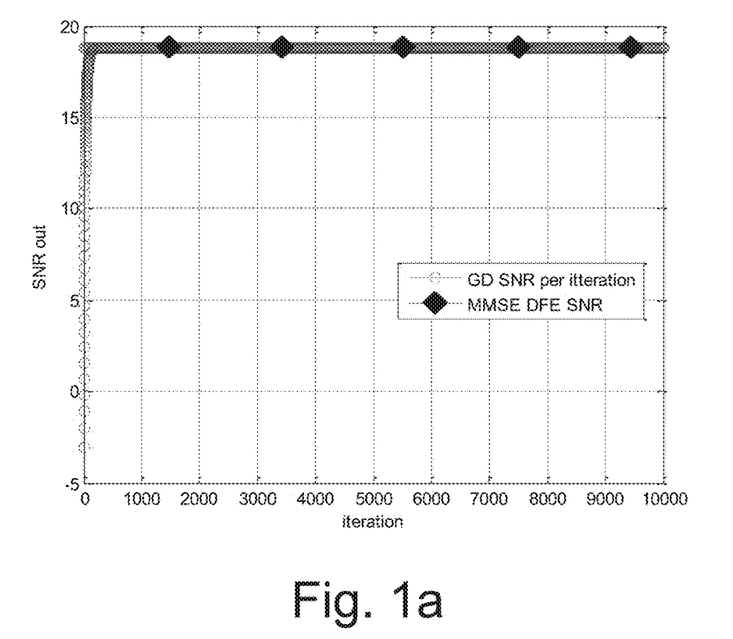
FIGS. 1a-1f illustrate the convergence of the proposed FFE coefficients calculation algorithm for several randomly chosen channels, from a simple initialization with a small step size.
Figure 1B:
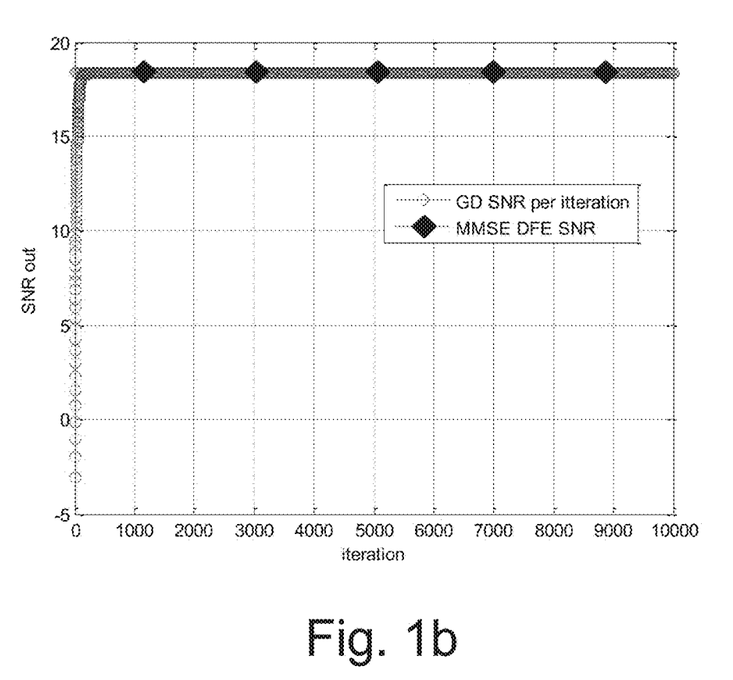
Figure 1C:
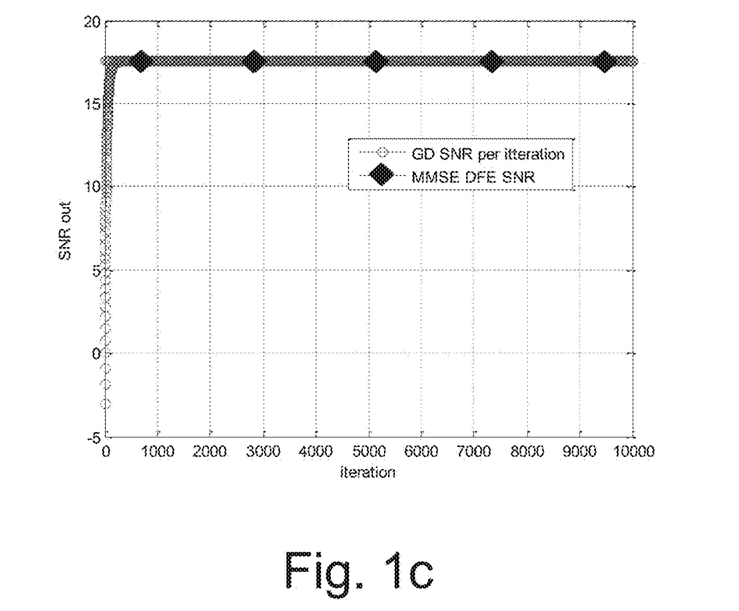
Figure 1D:
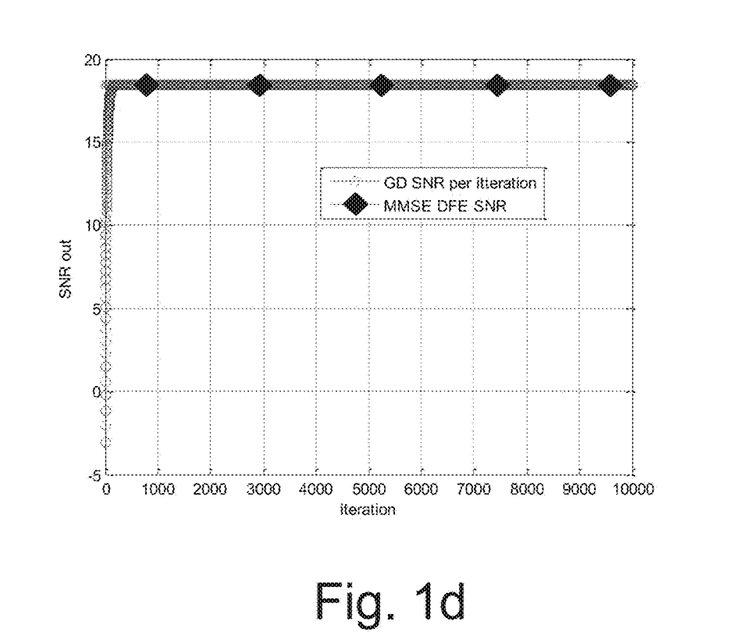
Figure 1E:
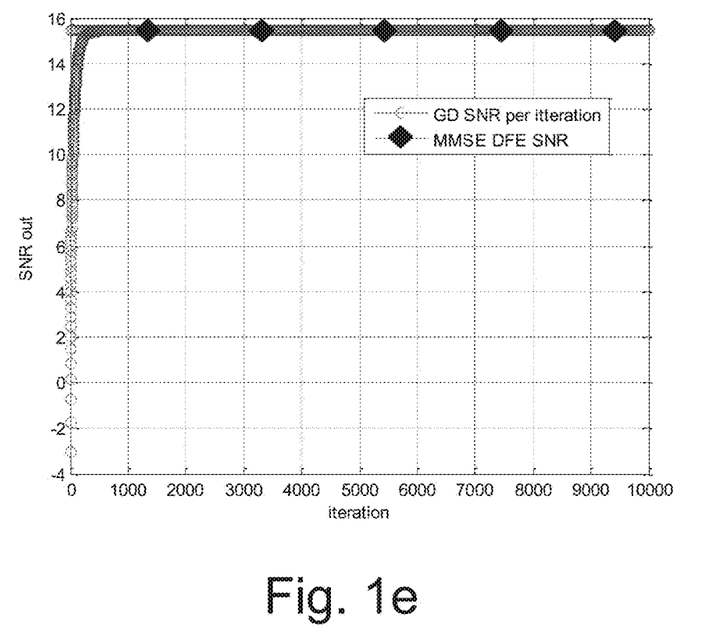
Figure 1F:
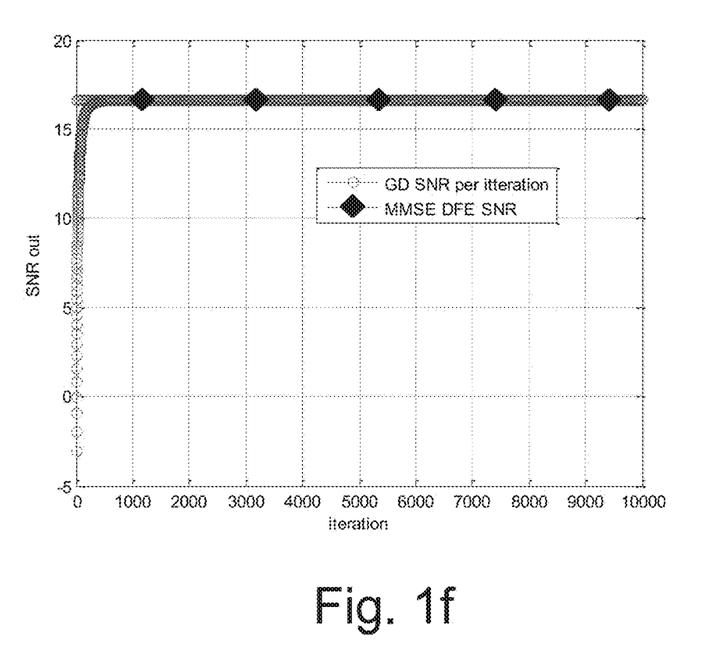
Figure 2A:
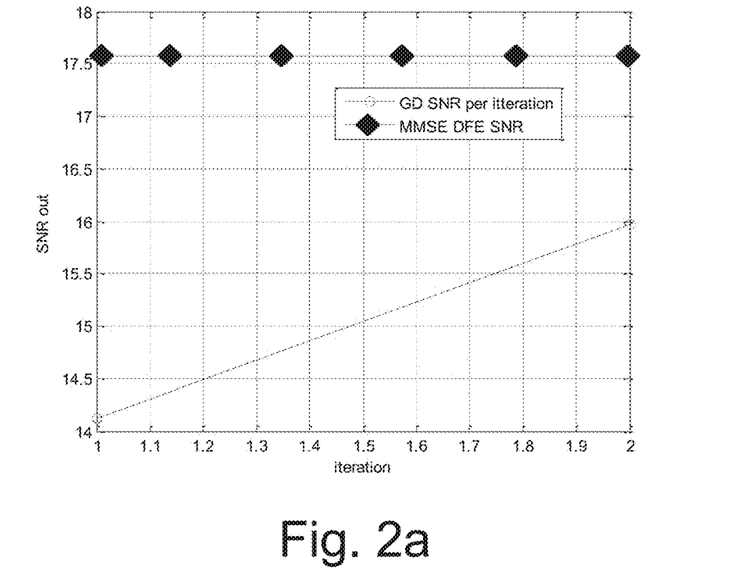
FIGS. 2a-2d illustrate the performance of one iteration with a large step size.
Figure 2B:
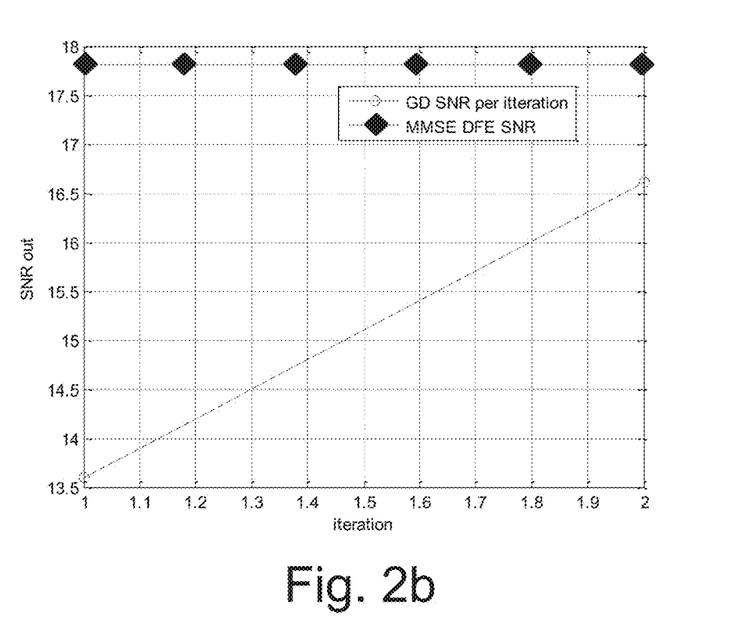
Figure 2C:
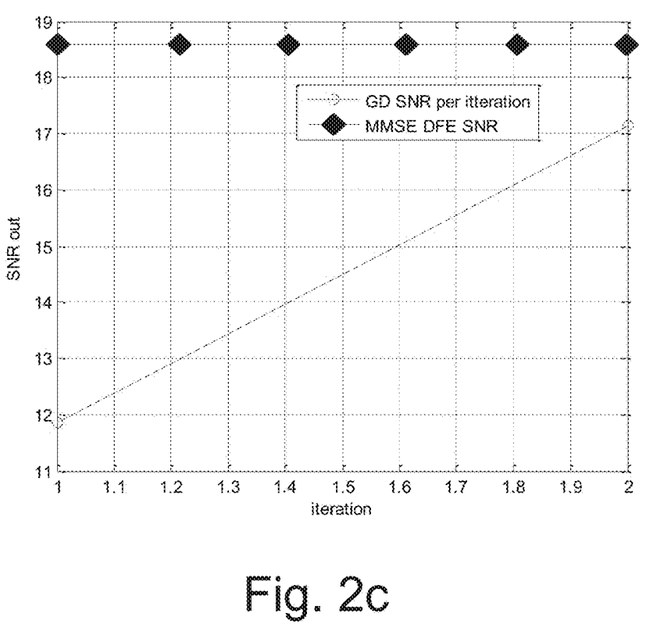
Figure 2D:
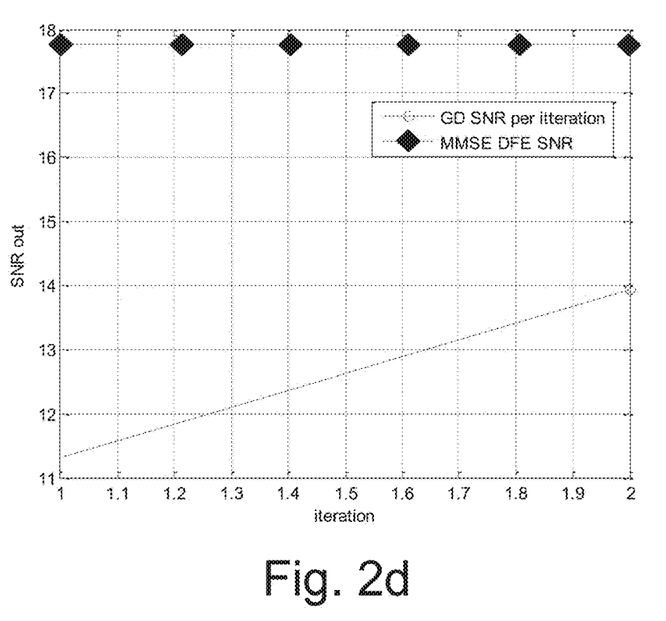
Figure 3:
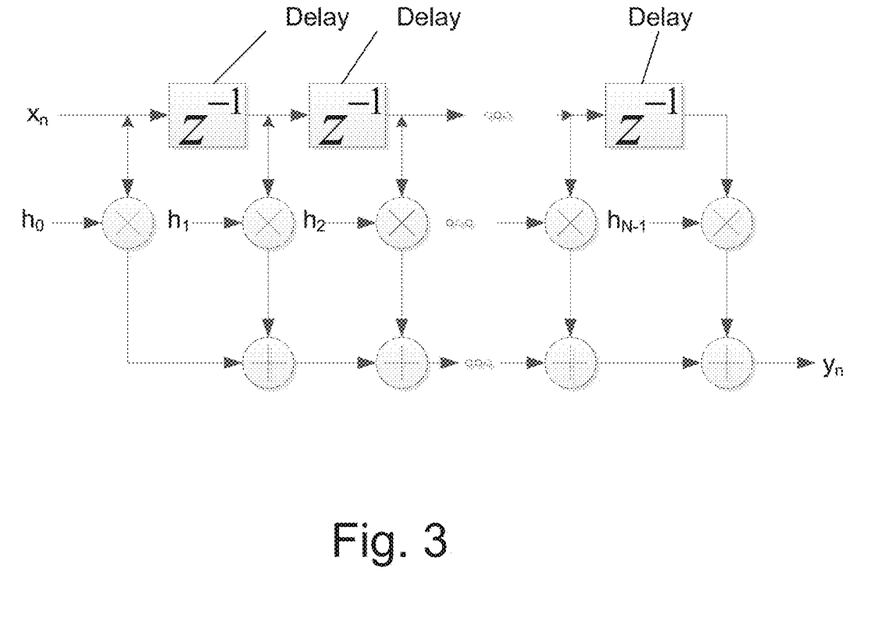
FIG. 3 shows the basic block diagram for an FIR filter of length N, for implementing the FFE proposed by the present invention.

The FFE may be implemented a Finite Impulse Response (FIR) filter, using a series of delays, multipliers, and adders to create the filter's output. FIG. 3 shows the basic block diagram for an FIR filter of length N, implementing the proposed FFE. The delays result in operating on prior input samples. The $f_k$ values are the coefficients used for multiplication, so that the output at time n is the summation of all the delayed samples multiplied by the appropriate coefficients. The longer the filter (more taps), the more finely the response can be tuned.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A nonlinear equalizer for iteratively equalizing a data communication channel, comprising:
   a) a transmitter at an input of said channel, for transmitting data and one or more training sequences over said channel;
   b) a receiver at an output of said channel, for receiving said data and said one or more training sequences;
   c) a sampling circuit for sampling received data;
   d) a processor, for processing samples, said processor is adapted to:
      d.1) calculate a derivative of a Mean Square Error (MSE) for a filter using Feed Forward Equalization (FFE) taps;
      d.2) calculate a derivative of a variance of noise enhanced by said filter, using said Feed Forward Equalization (FFE) taps;
      d.3) iteratively update Feed Forward Equalization (FFE) coefficients of said filter, while during each update, injecting samples of a known training sequence into said channel,
   wherein during each update, performing the following operations:
      d.4) computing a derivative (dN) of a noise variance at an output of said equalizer, by applying convolution between a noise correlation ($R_{WW}$) and current Feed Forward Equalization (FFE) taps ($f^{(i-1)}$);
      d.5) computing an effective channel and a modified effective channel ($g_{Win}$);
      d.6) computing a derivative (dR) of a residual Inter-Symbol Interference (ISI), by applying correlation between an original channel (h) and the modified effective channel ($g_{Win}$); and
      d.7) updating the Feed Forward Equalization (FFE) coefficients, with a step proportional to an opposite of the gradient.

2. The equalizer according to claim 1, in which the equalized data channel is part of:
   data center connectivity;
   router connectivity;
   data center inter connections;
   optical networks;
   a metro system;
   wireless back-haul; or
   communication links with slow varying channels.

3. The equalizer according to claim 1, wherein the equalizing signals transmitted through the data communication channel are modulated according to a modulation format selected from a group consisting of:
   Non-Return-To-Zero (NRZ);
   On-Off Keying (OOK);
   Optical Dual Binary (ODB);
   Pulse-Amplitude Modulation (PAM);
   Quadrature Amplitude Modulation (QAM);
   Phase-Shift Keying (PSK);
   Frequency-Shift Keying (FSK);
   Minimum-Shift Keying (MSK).

4. The equalizer according to claim 1, in which the derivative $$\left( \frac{d(E(|n_{out}|^2))}{df[p]} \right)$$

of the variance of the enhanced noise with the taps of the Feed Forward Equalization (FFE) in one or more iterations is a convolution between the input noise correlation and the current Feed Forward Equalization (FFE) coefficients.

5. The equalizer according to claim 1, in which the training sequences are replaced by decisions of a decision algorithm, for decoding the received data.

6. A method of calculating coefficients of an equalizer utilizing Feed Forward Equalization (FFE)/Decision Feedback Equalizer (DFE) for equalizing a data communication channel, comprising:
   e) generating an analytical estimated channel model;

f) applying a real time steepest descent iterative computation and tracking process, based on channel estimation inputs, provided by said estimated analytical channel model;

g) enabling real time hardware tracking by using new channel estimation inputs, provided by said analytical estimated channel model, and previous Feed Forward Equalization (FFE)/Decision Feedback Equalizer (DFE) coefficients; and h) converging to a new optimal computation of coefficients by:
  h.1) calculating the derivative of Mean Square Error (MSE) for each filter, implementing taps of said Feed Forward Equalization (FFE);
  h.2) calculating the derivative of the variance of the noise enhanced by said filter, using said Feed Forward Equalization (FFE) taps;
  h.3) iteratively updating the Feed Forward Equalization (FFE) coefficients ($f^{(i)}$) while during each update, injecting samples of a known training sequence into said channel,
    wherein during each update, performing the following operations:
  h.4) computing the derivative (dN) of a noise variance at the output of said equalizer, by applying convolution between the noise correlation ($R_{ww}$) and the current Feed Forward Equalization (FFE) taps ($f^{(i-1)}$);
  h.5) computing the effective channel and the modified effective channel ($g_{Win}$);
  h.6) computing the derivative (dR) of the residual Inter-Symbol Interference (ISI), by applying correlation between the original channel (h) and the modified effective channel ($g_{Win}$); and
  h.7) updating the Feed Forward Equalization (FFE) coefficients, with a step proportional to the opposite of the gradient.

7. The method according to claim 6, wherein a cost-function for optimization of Feed Forward Equalization (FFE)/Decision Feedback Equalizer (DFE) coefficients for reaching an optimal solution that corresponds to a minimal value of said cost-function is defined according to implementation/application criterion.

8. The method according to claim 7, wherein the implementation/application criterion is selected from the group of:
  Minimum Mean Square Error (MMSE);
  Zero-Forcing (ZF);
  fixed target channel;
  Minimum Mean Square Error-Unit Energy Constraint (MMSE-UEC).

9. The method according to claim 6, applied to coherent systems.

* * * * *